US012442428B2

(12) United States Patent
Fu

(10) Patent No.: US 12,442,428 B2
(45) Date of Patent: Oct. 14, 2025

(54) MASS DAMPER DEVICE, WORKING TOOL AND WORKING TOOL HOLDER COMPRISING A MASS DAMPER DEVICE

(71) Applicant: MAQ AB, Saltsjö-Boo (SE)

(72) Inventor: Qilin Fu, Solna (SE)

(73) Assignee: MAQ AB, Saltsjo-Boo (SE)

( * ) Notice: Subject to any disclaimer, the term of this patent is extended or adjusted under 35 U.S.C. 154(b) by 1113 days.

(21) Appl. No.: 17/193,153

(22) Filed: Mar. 5, 2021

(65) Prior Publication Data

US 2021/0262544 A1    Aug. 26, 2021

Related U.S. Application Data

(63) Continuation of application No. PCT/EP2019/073874, filed on Sep. 6, 2019, and a
(Continued)

(51) Int. Cl.
| *F16F 7/108* | (2006.01) |
| *B23B 27/00* | (2006.01) |
| *F16F 15/14* | (2006.01) |

(52) U.S. Cl.
CPC .......... *F16F 7/108* (2013.01); *B23B 27/002* (2013.01); *F16F 15/1442* (2013.01);
(Continued)

(58) Field of Classification Search
CPC .. F16F 7/108; F16F 15/1442; F16F 2224/025; F16F 2234/02; F16F 2222/08;
(Continued)

(56) References Cited

U.S. PATENT DOCUMENTS 2,699,696 A * 1/1955 Hahn .................... B23B 29/022
                                                   408/143
3,486,585 A    12/1969 Richter et al.
(Continued)

FOREIGN PATENT DOCUMENTS

| CN | 107335821 A | 11/2017 |
| CN | 107962218 A | 4/2018 |

(Continued)

OTHER PUBLICATIONS

Iglesias, A. et al., "Machining improvement on flexible fixture through viscoelastic damping layer," In: International Conference on Advanced Manufacturing Engineering and Technologies, NEWTECH 2013, Stockholm (2013), pp. 179-188.
(Continued)

*Primary Examiner* — Sara Addisu
(74) *Attorney, Agent, or Firm* — RMCK Law Group, PLC

(57) ABSTRACT

A mass damper device includes a tubular housing having a first and a second longitudinal end; at least one damping mass which is received in the tubular housing with a circumferential clearance; a first resilient element and a second resilient element. At least one end closure is arranged at the first or second longitudinal end. The housing and the end closure have cooperating mounting surfaces which define a longitudinal mounting position of the first and second end closures. The mounting surfaces are arranged such that the first and second resilient elements are compressed between the damping mass and the end closure, when the first and second end closures have been mounted, at the longitudinal mounting position, to the housing.

16 Claims, 8 Drawing Sheets

Related U.S. Application Data continuation-in-part of application No. PCT/SE2018/050900, filed on Sep. 7, 2018, said application No. PCT/EP2019/073874 is a continuation-in-part of application No. PCT/SE2018/050900, filed on Sep. 7, 2018.

(52) U.S. Cl.
CPC ....... *B23B 2250/16* (2013.01); *F16F 2222/08* (2013.01); *F16F 2224/025* (2013.01); *F16F 2226/04* (2013.01); *F16F 2228/007* (2013.01); *F16F 2232/02* (2013.01); *F16F 2232/08* (2013.01); *F16F 2234/02* (2013.01); *F16F 2236/08* (2013.01)

(58) Field of Classification Search
CPC ............. F16F 2226/04; F16F 2228/007; F16F 2232/08; F16F 2236/08; F16F 2228/005; F16F 2228/066; B23B 27/002; B23B 2250/16; B23Q 11/0032; B23Q 11/0035
See application file for complete search history.

(56) References Cited

U.S. PATENT DOCUMENTS

| | | | | |
|---|---|---|---|---|
| 3,559,512 | A * | 2/1971 | Aggarwal | F16F 7/10 188/322.5 |
| 3,774,730 | A * | 11/1973 | Maddux | B23B 29/022 188/379 |
| 3,820,422 | A * | 6/1974 | Rivin et al. | B23B 29/022 82/158 |
| 3,838,936 | A * | 10/1974 | Andreassen | F16F 7/108 409/141 |
| 4,553,884 | A | 11/1985 | Fitzgerald et al. | |
| 5,326,324 | A | 7/1994 | Hamada | |
| 5,413,318 | A | 5/1995 | Andreassen | |
| 6,443,673 | B1 | 9/2002 | Etling et al. | |
| 7,234,379 | B2 * | 6/2007 | Claesson | B23Q 11/0039 82/158 |
| 7,681,869 | B2 | 3/2010 | Digernes | |
| 8,371,776 | B2 * | 2/2013 | Lin | B23B 27/007 82/158 |
| 9,079,256 | B2 * | 7/2015 | Freyermuth | B23C 5/003 |
| 9,533,357 | B2 * | 1/2017 | Frota de Souza Filho | B23B 27/007 |
| 9,579,730 | B2 * | 2/2017 | Frota de Souza Filho | B23B 27/002 |
| 9,855,611 | B2 * | 1/2018 | Eichelberger | B23B 29/022 |
| 2003/0139217 | A1 | 7/2003 | Zhu et al. | |
| 2003/0147707 | A1 * | 8/2003 | Perkowski | F16F 7/10 407/30 |
| 2006/0275090 | A1 * | 12/2006 | Onozuka | B23B 29/022 408/143 |
| 2010/0096228 | A1 * | 4/2010 | Digernes | B23C 5/003 188/269 |
| 2010/0242696 | A1 * | 9/2010 | Digernes | B23B 27/10 83/169 |
| 2016/0067787 | A1 * | 3/2016 | Giannetti | B23B 27/002 29/407.01 |
| 2016/0185934 | A1 | 6/2016 | Ismail et al. | |
| 2016/0305503 | A1 * | 10/2016 | Freyermuth | F16F 7/108 |
| 2016/0311031 | A1 * | 10/2016 | Giannetti | B23B 29/022 |
| 2017/0197251 | A1 * | 7/2017 | Nakatani | F16F 15/08 |
| 2018/0281074 | A1 * | 10/2018 | Eichelberger | F16F 7/108 |
| 2023/0116863 | A1 * | 4/2023 | Fu | B23B 27/002 408/143 |

FOREIGN PATENT DOCUMENTS

| | | |
|---|---|---|
| EP | 0094557 A1 | 11/1983 |
| EP | 3300820 A1 | 4/2018 |
| GB | 2063417 A | 6/1981 |
| JP | 8591106 A | 1/1984 |
| JP | 2002097307 A | 4/2002 |
| JP | 2006502012 A | 1/2006 |
| JP | 2006504048 A | 2/2006 |
| JP | 2006189092 A | 7/2006 |
| JP | 2009542446 A | 12/2009 |
| JP | 2016536415 A | 11/2016 |
| WO | 2008002145 A1 | 1/2008 |
| WO | 2018044216 A1 | 3/2018 |

OTHER PUBLICATIONS

PCT International Preliminary Report On Patentability (IPRP) dated Dec. 9, 2020 for International Application No. PCT/EP2019/073874, 21 pages.

PCT International Search Report and Written Opinion dated Dec. 20, 2019 for International Application No. PCT/ EP2019/073874, 17 pages.

PCT International Search Report and Written Opinion dated May 7, 2019 for International Application No. PCT/ SE2018/050900, 13 pages.

* cited by examiner

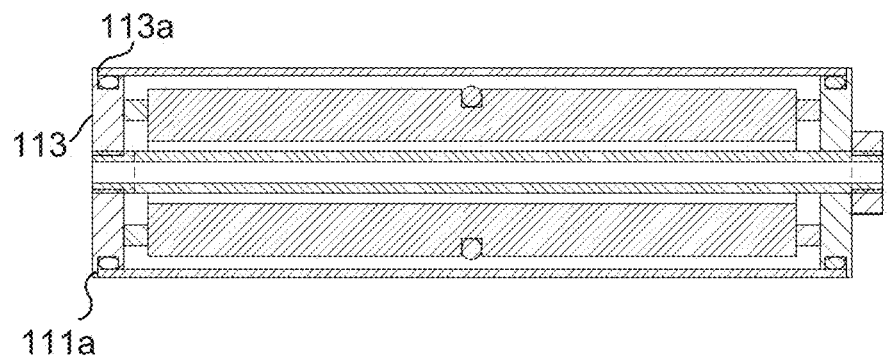
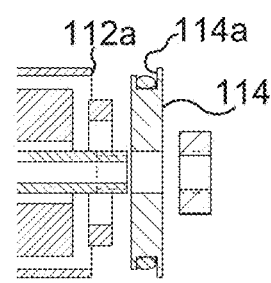
Fig. 2a        Fig. 2b
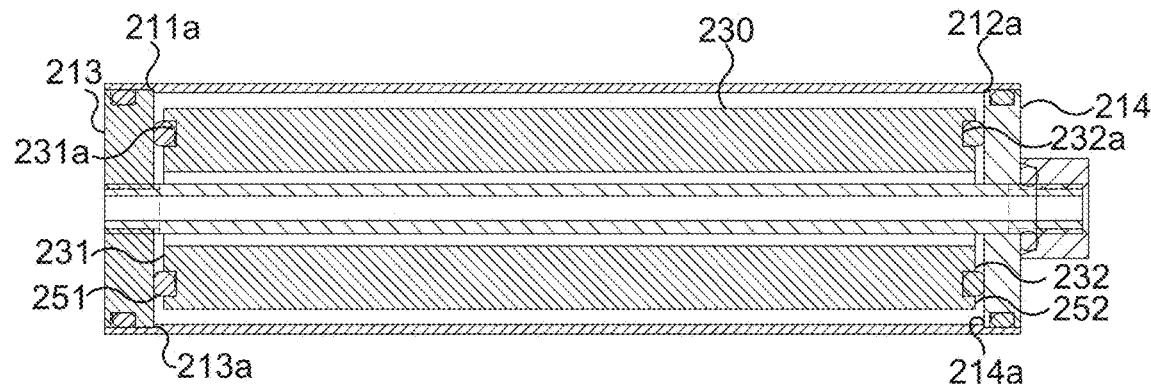
Fig. 3
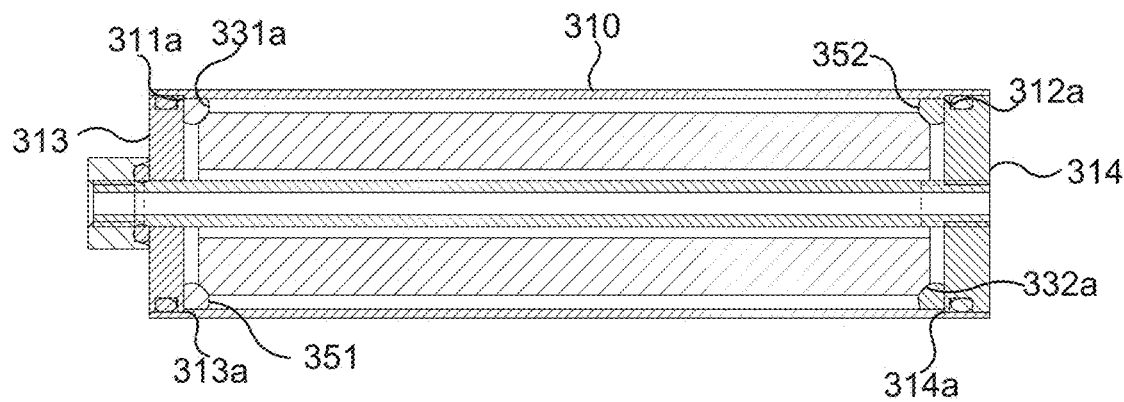
Fig. 4

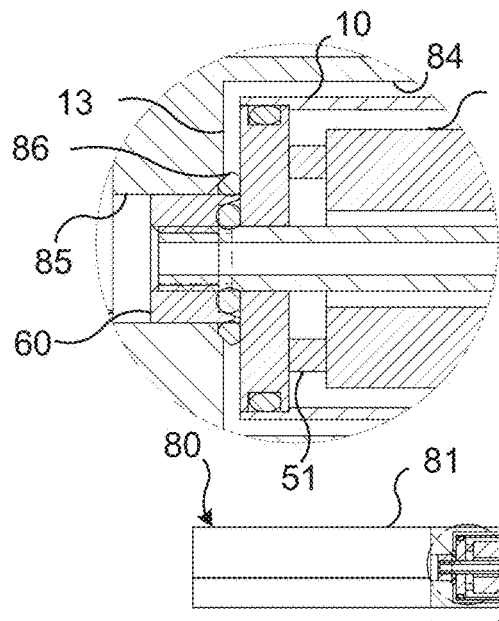
Fig. 9b
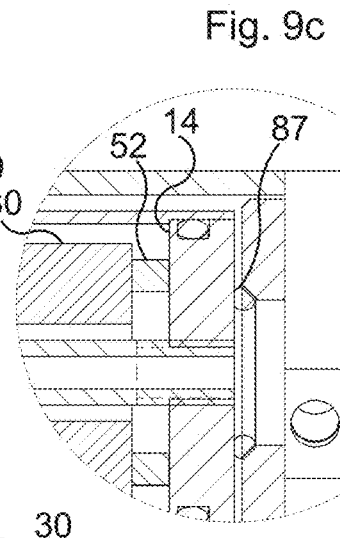
Fig. 9c
Fig. 9a
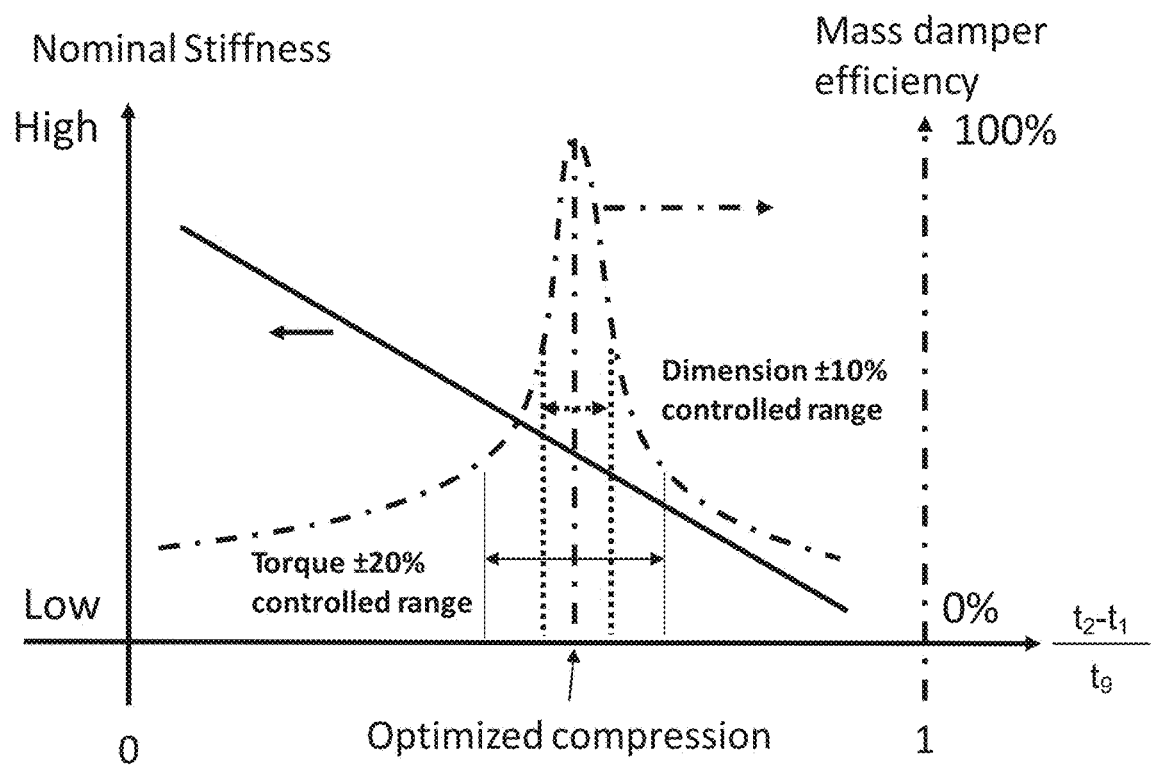
Fig. 10

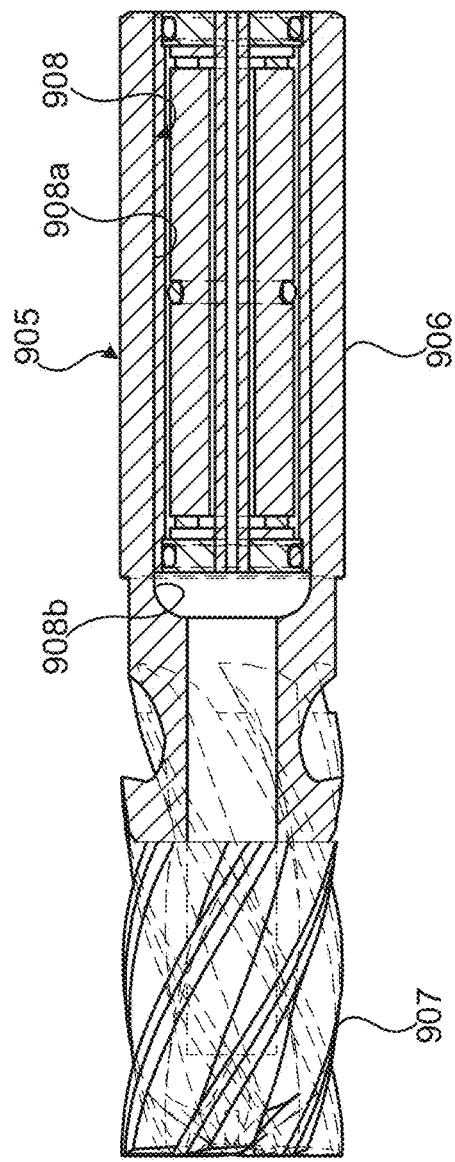
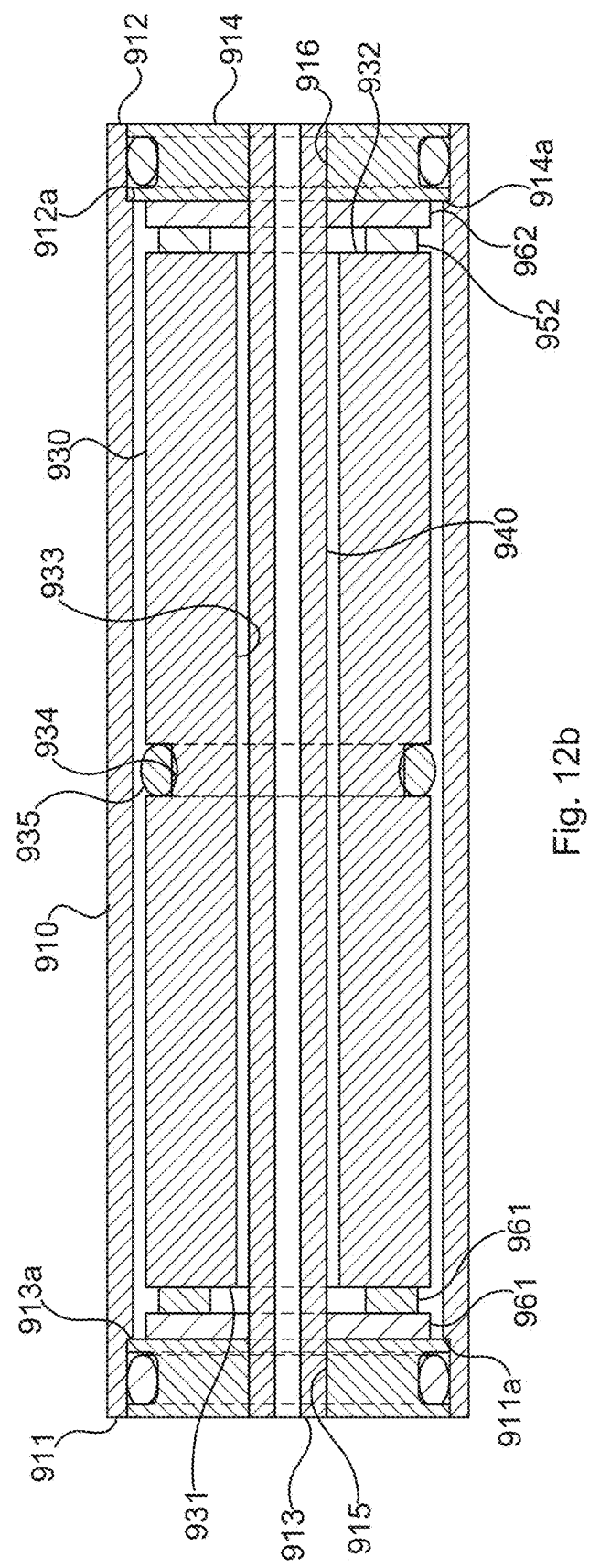
Fig. 12a
Fig. 12b

MASS DAMPER DEVICE, WORKING TOOL AND WORKING TOOL HOLDER COMPRISING A MASS DAMPER DEVICE

CROSS-REFERENCE TO RELATED APPLICATIONS

This application is: (i) a bypass continuation of International Application No. PCT/EP2019/073874, filed Sep. 6, 2019, which claims priority to International Patent Application No. PCT/SE2018/050900, filed Sep. 7, 2018, and (ii) a bypass continuation-in-part of International Application No. PCT/SE2018/050900, filed Sep. 7, 2018. The disclosures of each of the above applications are incorporated herein by reference in their entirety.

TECHNICAL FIELD

The present disclosure generally relates to a mass damper device which may be used at mechanical structures. In particular, a mass damper device for a working tool, a working tool comprising the mass damper device and a working tool holder comprising the mass damper device are provided.

BACKGROUND AND PRIOR ART

Mechanical structures are prone to vibrate when subjected to dynamic loads. Severe vibrations may lead to structure failure and need vibration damping means to control the vibration amplitude. Cutting tools e.g. are usually implemented as cantilever structures and their stiffness substantially decreases with an increased overhang length to diameter ratio. When machining a metal workpiece with a cutting tool, the cutting generates periodic forces on the cutting tool and vibrations arise.

For machine tools such as machine cutting tools, the typical vibration frequency range is between 100 Hz and 4000 Hz. Reduced vibration can increase the productivity of a metal removing process with a high-quality surface finish. Of all the vibration damping mechanisms, the mass damper solution is most effective and widely used on machine tool components.

The basic construction of a mass damper on cutting tools includes a damping mass typically made of tungsten material suspended by a set of resilient materials, such as rubber materials.

U.S. Pat. No. 5,413,318A discloses a mass damper for a cutting tool at which a damping mass is supported by spring elements made of rubber. In addition viscous oil is used to fill in the clearance between the damping mass and a central support extending through an axial bore in the damping mass.

EP3300820A1 discloses a tool body including a damping apparatus. The tool body comprises a tubular casing and a tool body fixed part fixed to each end of the casing. A damping mass with a central bore surrounding a central axial tube is received in the casing and supported by a ring-like piece arranged between each end of the damping mass and a respective tool body fixed part. Each ring-like piece comprises two disk-like members with an intermediate elastic element having two axially extending socket-like portions. When assembling the tool body, the damping mass and the ring-like pieces are inserted into the casing and a tool body fixed part is screwed into each end of the casing. Thereby, the socket like portions are compressed for forming a seal between the damping mass and the respective tool body fixed part.

U.S. Pat. No. 6,443,673B1 discloses a mass damper comprising a tuning mechanism for adjusting the stiffness of the resilient materials.

For controlling the mass damping efficiency, it is important to adjust the mass damper's Eigen frequency to match the vibration frequency of the vibrating object such that a cutting tool or the like. Such adjustment of the Eigen frequency is normally referred to as 'tuning' the mass damper. For traditional mass dampers where the damping mass is supported by commonly used resilient materials, such as natural rubber O-rings, the tuning uses compression induced dimension change to fine tune the stiffness of the resilient element. The pre-compressing of the rubber O-rings is normally achieved by adjusting the torque of a screw clamping mechanism, such as described in U.S. Pat. No. 6,443,673B1. When the vibrating object's vibration frequency is below 300 Hz, the stiffness needs to be small and the compression load is trivial because of the governing equation:

$$f_n = \frac{1}{2\pi}\sqrt{\frac{k}{m}}$$

Wherein $f_n$ is the eigen frequency, k is stiffness of the resilient element and m is the mass of the damping mass.

When the clamping torque on the tuning mechanism is below 1 Nm, it becomes cumbersome to measure and control because the torque wrench normally has an inaccuracy of about +20%. An incorrect tuning will cause the mass damper to lose its damping effect, and the cutting tool will start to malfunction in metal cutting processes.

WO 2018/044216 A1 discloses a mass damper at which the damping mass supported by resilient materials having frequency dependent stiffness. By this means it is possible to automatically and continuously adjust the stiffness of the resilient materials for achieving a wide Eigen frequency range. Thus, one mass damper can cover a wide range of vibration frequencies and one mass damper with a fixed pre-setting can be used at many alternative applications. Such self-tuning mass dampers are normally pre-tuned with a low stiffness of the resilient elements, since the stiffness of the resilient materials increases with frequency. The nominal stiffness is normally set by compressing the resilient material to a certain degree which corresponds to the desired nominal stiffness. The precise control of the compression is challenging as the required torque on a tuning mechanism can become smaller than 0.1 Nm.

Additionally, the resilient materials are prone to have a creeping phenomenon and the damping mass may drift from the central position over time. Under extreme conditions, the damping mass may get stuck in the cavity of the tool holder, and the mass damper will then lose the optimum damping performance.

When the damping mass drifts away from its central position, the mass may collide with the tool holder body, and the collision has metal to metal contact. Such collisions should be avoided because it impairs the overall damping performance of the mass dampers.

The developments of cryogenic machining and laser assisted machining make the tool holder and mass dampers exposed to high or low temperature during operation. The traditional resilient element of the mass dampers, such as natural rubbers, are sensitive to the temperature variations. Too high or too low temperature will completely change the stiffness of the resilient element and lead to a miss-tuning failure.

Modern high-pressure coolant machining also put severe requirements on sealing of the mass damper from coolants. To provide a proper sealing for high pressure fluids, the surface areas that are in contact with the sealant need a high surface quality to build a proper surface contact to avoid leakage. The conventional mass damper on tool holders further requires deep hole. Such deep hole machining is difficult because of the need for high aspect ratio (L/D) tools for reaching internal areas. When an air-tight sealing (surface Ra<0.4 µm) surface finish is needed on the mass damper, it is difficult and expensive to grind or polish the deep end inner surface of the deep hole. The high aspect ratio tools have very low stiffness and will have vibration problems during the machining processes.

With the described technical challenges of mass dampers on cutting tool holders and other machine tools, the invention aims to provide an easy to be integrated technology of a mass damper module that can overcome these technical challenges.

SUMMARY

One object of the invention is therefore to provide an enhanced mass damper device.

Another object is to provide such a mass damper device which may readily be mounted to and dismounted from existing machine components, such as working tools and working tool holders.

Yet another object is to provide such a mass damper device at which the resilient elements are securely held in place.

Still another object is to provide such a mass damper device which forms an integral modular unit that may easily be moved from one tool or tool holder to the other in order to thereby be reused at different applications.

A further object is to provide such a mass damper device at which the resilient materials may be accurately compressed with high precision during assembly of the mass damper device.

Yet a further object is to provide such a mass damper device which exhibits an improved temperature resistance when subjected to the thermal load and temperature variations in machining.

A still further object is to provide such a mass damper device which may be used at applications which involve the use of high pressure coolants.

Yet another object is to provide such a mass damper device at which the risk of the damping mass contacting surrounding components is reduced.

A further object is to provide such a mass damper device which exhibits enhanced thermal stability.

A further object is to provide such a mass damper device which may readily be manufactured at a low cost.

Yet another object is to provide such a mass damper device at which the damping efficiency of the mass damper is increased.

According to a first aspect, these and other objects are achieved by a mass damper device as defined by appended claim 1. The mass damper device is intended for use at a stationary or rotational machine tool. The mass damper device comprises a tubular housing having a first and a second longitudinal end. At least one damping mass is received in the tubular housing with a circumferential clearance. It further comprises a first resilient element, a second resilient element and at least one first end closure arranged at the first or second longitudinal end. The housing and the end closure have cooperating mounting surfaces which define a longitudinal mounting position of the end closure. The mounting surfaces are arranged such that the first and second resilient elements are compressed between the damping mass and the end closure, when the end closure has been mounted at the longitudinal mounting position, to the housing.

At mass damper devices comprising resilient elements supporting the damping mass, a correct compression of the resilient elements is of great importance for several reasons. Firstly, a correct compression of the resilient elements is important for achieving a satisfactory fixation of the resilient elements. Such fixation may be accomplished merely by friction acting between the resilient element on the one hand and the damping mass and the end closure on the other hand. At some applications there may also be other intermediate components, such as heat insulating disks arranged between the damping mass, the resilient element and/or the end closure. At such applications using merely friction for achieving the secure holding of the resilient member, a comparatively high compression of the resilient member is required. At other applications where the resilient member is fixed by adhesion, a lower compression of the element may suffice. In both cases it is important that the compression is sufficiently high for achieving secure fixation. However, it is also important that the compression is not too high, since such over-compression may deform the resilient element to thereby negatively influence its damping properties.

Additionally, a correct compression of the resilient elements may be used to give the resilient elements the correct geometrical shape and dimensions. At some resilient materials with vibration damping properties, it has proven that the shape and dimensions of the resilient elements is of importance for achieving the correct damping. In cases where the resilient material to use at the mass damper device is not available in the desired dimensions and shape, a correct compression of the resilient elements may be used to give the element the desired shape and dimensions.

With the mass damper device of this disclosure, the compression rate of the resilient element is defined by the positions of the mounting surfaces arranged on the housing and the at least one end closure. By this means the compression rate is determined when machining the housing and the end closures. Since such machining may be preformed with very high precision and accuracy, a compression rate having correspondingly low tolerances will automatically be achieved when assembling the mass damper device. The achievement of a well defined and precise compression rate is thus completely independent of any manual tuning or other operations carried out at the assembly.

Additionally, the resilient elements should preferably be given a particular nominal Eigen frequency. At some applications the correct nominal Eigen frequency may be achieved by compression of the resilient elements. By arranging the mass damper device such that the resilient elements are correctly compressed to a desired and predetermined compression rate simply by mounting the end closures at their correct longitudinal mounting positions, the achievement of a correct tuning to the desired nominal Eigen frequency of the damping mass is greatly facilitated. By this means no additional adjustment or tuning by means of adjustable clamping means or the like is required.

In addition, the use of cooperating mounting surfaces for defining the correct longitudinal mounting positions for the end closures greatly facilitates mounting of the end closures at the correct position for achieving the desired compression of the resilient elements. Assembly and disassembly of the mass damping device is thereby facilitated which in turn contributes to decrease the manufacturing cost for the device. Correct compression of the resilient elements for achieving secure fixation, desired shape and dimensions of the resilient elements and/or correct tuning of the mass damper is thus achieved automatically by means of a simplified assembling of the device.

The mounting surfaces may be arranged such that the first and second resilient elements are compressed to a predetermined compression rate between the damping mass and the end closure, when the end closure has been mounted, at the longitudinal mounting position, to the housing.

The predetermined compression rate may range between 5% to 50%, such as between 20% to 30%. These compression rate intervals have proven to be particularly suitable for resilient elements made from several different resilient materials.

The mounting surfaces may be mutually parallel and arranged such that each resilient element is evenly compressed over its surfaces facing the damping mass and the end closure. This affords for secure fixation and homogeneous damping properties of the resilient element.

The cooperating mounting surfaces may comprise a least one first contact surface arranged at or in proximity to a longitudinal end of the housing and at least one second contact surface arranged at the first and/or a second end closure, which first and second contact surfaces are in mutual contact when the respective end closure is in the longitudinal mounting position.

Alternatively or in combination the cooperating mounting surfaces may comprise a least one first alignment surface arranged at or in proximity to a longitudinal end of the housing and at least one second alignment surface arranged at the first and/or a second end closure, which first and second alignment surfaces are arranged in the same cross sectional plane of the housing when the respective end closure is in the longitudinal mounting position.

The first and second resilient elements may comprise a material having a frequency depending stiffness, i.e. a frequency depending elastic modulus.

The first and second resilient elements may comprise a material at which, after mounting the end closure at the longitudinal mounting position, the Young's modulus increases by at least 20% when the vibration frequency of the damping mass increase by 100%, over the frequency range from 100 Hz to 2000 Hz.

For example, the first and second resilient elements may preferably comprise a material at which the Young's modulus increases by at least 30% when the vibration frequency of the damping mass increase by 100%, over the frequency range from 100 Hz to 2000 Hz.

The first and second resilient elements may e.g. comprise a material at which the Young's modulus increases by at least 20% when the vibration frequency of the damping mass increase by 100%, over the frequency range from 100 Hz to 4000 Hz.

The governing equation for mass dampers to work at its optimized condition is:

$$f_{mass\ damper} = f_{vibration} = \frac{1}{2\pi}\sqrt{\frac{k_{mass\ damper}}{m_{mass\ damper}}}$$

where $f_{mass\ damper}$ is the tuned frequency of the mass damper, $f_{vibration}$ is the vibrating frequency of the object, such as the machining tool, $k_{mass\ damper}$ is the supporting stiffness of the mass damper and $m_{mass\ damper}$ is the mass of the mass damper.

When the vibrating frequency of the object is varying, the ideal condition for optimized mass damping will require that:

$$k_{mass\ damper} = (2\pi \times f_{vibration})^2 \times m_{mass\ damper}$$

because the weight of the mass is usually fixed.

As an example, if the frequency increases by 10%, the supporting stiffness of the mass dampers should increase 21% to make the tuning, i.e. matching the $f_{mass\ damper}$ and $f_{vibration}$. If the frequency increases by 100% (×2), the supporting stiffness shall increase 300% (×4) to make the tuning, and vice versa.

With reference to FIG. 13, the stiffness of the mass damper in the vibrating direction can be expressed as:

$$k_{mass\ damper} = 2 \times \frac{G \cdot A}{t}$$

where G is the Young's modulus of the supporting elements, A is the area of the cross-section surface, and t is the thickness of the supporting elements. When a tuning mechanism is not available, the parameters of A and t will be constant and the Young's modulus G shall change according to frequency to make the automatic tuning.

Ideally, the Young's modulus of a material shall increase by 300% when the frequency of vibration is increased by 100% to make an automatic tuning. Such a material does not naturally exist but there are materials having a Young's modulus that changes substantially comparing to others. For example, the 3M @112 polymer's Young's modulus will increase by 50% when the vibration frequency increases by 100% from 100 Hz to 200 Hz, whereas the more conventional sylomer sr850 material's Young's modulus increase only by 9% under the same condition.

As an example, two mass dampers are pre-tuned at 100 Hz and one uses 3M @112 polymer to support the mass, while the other uses sylomer SR850 to support the mass. When the vibration frequency becomes 200 Hz, the mass damper's frequencies becomes 122 Hz for the 3M112 polymer case and 104 Hz for the sylomer SR850 case. Since the frequency gap to 200 Hz is 78 Hz for the 3M @112 case versus 96 Hz for the sylomer SR850 case, the 3M @112 case will perform a better mass damping function because the frequency gap to the target frequency is smaller comparing to that of sylomer SR850 case.

In reality, there are also cases where the machine tool's vibration frequency varies within 10% instead of 100%. And for these cases, using the 3M112 polymer material will provide a better automatic tuning function comparing to that of sylomer SR850.

Typical machine tools vibrate at frequencies above 30 Hz. In most common cases, the machine tools vibrate between 100 Hz and 2000 Hz depending on the set-up condition. To provide an automatic tuning function, it is necessary that the supporting elements of mass dampers are made of material that has an Young's modulus (stiffness) that changes by at least 20% when the frequency is changed by 100%.

In addition to the above exemplifying 3M® 112 material there also exist other material having similar frequency depending Young's modulus which are suitable to use in the resilient elements of the present mass damper device.

Examples of such materials are 3M® 110, 130, 242NR01 and 242NR02 viscoelastic polymers.

The material may thus be chosen from the group comprising 3M® 110, 130, 242NR01 and 242NR02 viscoelastic polymers.

The material having a frequency depending Young's modulus may comprise a nanostructure material with a structural size of 100 nm or less in at least one dimension.

Throughout the present disclosure, the structural size of the nanostructure may alternatively be referred to as a grain size. The nanostructure of the resilient element having a structural size of 100 nm or less in at least one dimension provides for a stiffness that is dependent on the vibrational frequency of the resilient element. Thereby, a self-tuning function can be realized in the mass damper. The mass damper thereby constitutes a self-tuned mass damper.

A wide range of materials may have a nanostructure material with a structural size of 100 nm or less in at least one dimension. Examples include polymeric materials, resin, such as thermoset resin (resin prior to a curing process), nanocellulose, metal and graphene. Further examples of nanostructure materials with a structural size of 100 nm or less in at least one dimension include various materials doped with nanoparticles (e.g. carbon nanoparticles and the like), nanofibers (e.g. carbon nanotubes) and nanoflakes (e.g. graphene nanoflakes). For example, polymers may be doped with these dopants. Nanostructure materials according to the present disclosure may or may not be cross-linked.

Throughout the present disclosure, a nanostructure may be referred to as a material microstructure observed at the nm scale (e.g. one billionth of a meter), such as on the atomic or molecular level. For the purpose of this application, the term "nanostructure" typically refers to structures having a minor dimension that is greater than about 1 nanometer but typically substantially less than about 100 nm. The nanostructure of the resilient element may have a structural size of 100 nm or less in at least one dimension at room temperature (20° C.) or at typical machining environment temperatures (e.g. 0° C. to 60° C.). The nanostructure material of the resilient element according to the present disclosure may be prepared by a synthetic approach, such as mixing (e.g. adding nanoparticles into thermoset resin) and blending (e.g. mixing thermoset resin and polymeric materials, and then heat up to obtain a well-distributed mixture of substances that cannot be separated from each other), top-down patterned approaches including chemical vapor deposition (CVD) or molecular beam epitaxy (MBE).

The nanostructure material of the resilient element may have a structural size of 100 nm or less in at least two dimensions. Alternatively, or in addition, the nanostructure material of the resilient element may have a structural size of 40 nm or less, such as 20 nm or less, in at least one dimension, such as in two dimensions or in three dimensions. The spring element may be constituted by a solid piece of nanostructure material.

Identification of the nanostructure size can be made by means of a scanning electron microscope method, a transmission electron microscope method and an X-ray diffraction method. The X-ray diffraction method measures the dispersion of the X-ray diffraction pattern to decide the particle size.

The housing, the damping mass, the first and second resilient elements and the at least one end closure may form an integral module which is arranged to be inserted into and extracted from a working tool or a working tool holder.

Hence, at such embodiments the mass damper device does not comprise any structural parts of a working tool or a working tool holder per se. By this means the damper unit may readily be attached to and detached from a working tool or a working tool holder. A further particular advantage of this embodiment is that a mass damper device which has been used in one tool or tool holder may readily be moved to and reused at another tool or tool holder. Grace to the modular design not forming part of the tool or tool holder per se, the tool or tool holder from which the mass damper has been detached remain complete such that it still may be used normally with or without another mass damper device. The modular design also affords for that a modular system with a number of mass damper devices having different nominal Eigen frequencies may be achieved. In use, a mass damper device having the correct nominal Eigen frequencies for a certain application may then readily be selected and inserted into the working tool or working tool holder in question. Such a modular system greatly facilitates the administration and handling of mass dampers in workshops having a number of different machine tools.

The mass damper device may further comprise at least one sealing arranged between the housing and the first and/or second end closure.

The damping mass may be provided with at least one distancing member arranged to prevent the damping mass from contacting the interior longitudinal wall of the housing.

The at least one distancing member may comprise an annular member which encircles the damping mass.

Alternatively, or in combination, the distancing member may comprise a plurality of elongate members which extend radially out from the envelope surface of the damping mass and which are arranged to bend or buckle when making contact with the inner wall of the housing.

The distancing member may comprise a plurality of stud shaped members which extend radially out from the envelope surface of the damping mass and which are arranged to be axially compressed when making contact with the inner wall of the housing.

The at least one distancing member may comprise a pin shaped member which extends longitudinally from the damping mass to one of the first and second end closures.

The mass damper device may comprise a first end closure arranged at the first longitudinal end and a second end closure, arranged at the second longitudinal end.

According to a second aspect there is provided a working tool comprising a mass damper device as disclosed above.

According to a third aspect there is provided a working tool holder comprising a mass damper device as described above.

According to a fourth aspect there is provided working tool comprising a shank arranged to be fixed to a tool holder and a tool portion, wherein the shank exhibits an outwardly open, central and axial bore; and wherein a mass damper device is detachably fixed in the bore, said mass damper device comprising a tubular housing having a first and a second longitudinal end; at least one end closure arranged at the first or second longitudinal end; and at least one damping mass which is received in the tubular housing with a circumferential clearance and supported by a first and a second resilient element.

The various embodiments of the first aspect apply also to the fourth aspect, mutatis mutandis.

Further objects and advantages of the mass damper device according to the invention will be apparent from the detailed description of embodiments below and from the appended claims.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Further details, advantages and aspects of the present disclosure will become apparent from the following embodiments taken in conjunction with the drawings, wherein:

FIG. 2a is a longitudinal section through a mass damper according to a second embodiment and FIG. 2b shows a portion thereof in an exploded view.

FIG. 3 is a longitudinal exploded section of a mass damper according to a third embodiment.

FIG. 4 is a longitudinal section of a mass damper device according to fourth embodiment.

FIG. 9a is a side view, partly in section of a working tool holder provided with a mass damping device as shown in FIGS. 1a-c. FIGS. 9b and 9c show details thereof in enlarged scale.

FIG. 10 is a diagram illustrating the increased damping efficiency of the present mass damping device in comparison with previously known mass damping devices.

FIG. 11a is a perspective view of another working tool holder provided with a milling tool and FIG. 11b is a perspective view in enlarged scale illustrating the milling tool shown in FIG. 11a.

FIG. 12a is a longitudinal section of the milling tool shown in FIG. 11b and illustrates further a mass damper device inserted into the milling tool, FIG. 12b is a longitudinal section in enlarged scale of the mass damper device shown in FIG. 12a.

DETAILED DESCRIPTION

Figure 1A:
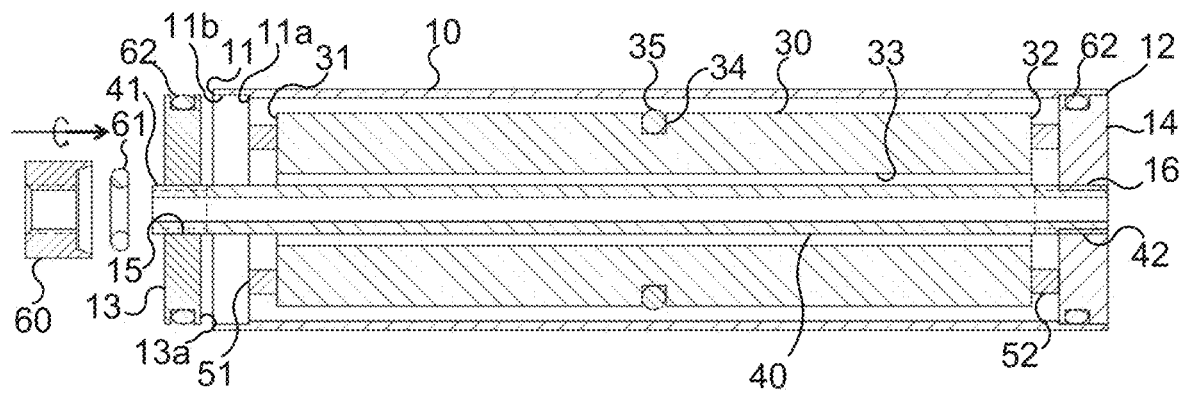
FIG. 1a is a longitudinal partly exploded section through a mass damper device according to a first embodiment of the invention.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIG. 1 illustrates a first exemplifying embodiment of a mass damper device. The mass damper is formed as a module which may be directly inserted in a conventional working tool or working tool holder having a standardized cavity for receiving various previously known mass damper arrangements.

The mass damper comprises a cylindrical tubular housing 10. The housing has a first 11 and a second 12 longitudinal end, each end defining a cross sectional plane which is perpendicular to the longitudinal axis of the housing.

A first end closure 13 is secured to the first longitudinal end 11 and a second end closure 14 is secured to the second longitudinal end 12 of the housing 10. A damping mass 30 is received in the housing 10 and arranged between the end closures 12, 13. The damping mass 30 is formed generally as annular cylindrical body having a constant cross section with and outer diameter D1 and an inner bore 33. The damping mass 30 exhibits a first longitudinal end 31 and a second longitudinal end 32. In the shown example, the damping mass 30 exhibits an outer circumferential grove 34 which is arranged centrally between the first 31 and second 32 longitudinal ends.

A coolant media tube 40 extends with a radial clearance through the central bore 33 and is received in central through openings 15, 16 in the first 13 and second 14 end closures respectively.

The mass damper further comprises a first 51 and a second 52 resilient element. The resilient elements 51, 52 are arranged for holding the damping mass 30 in the housing 10. The first resilient element 51 is clamped between the inside of the first end closure 13 and the end surface of the damping mass' first end 31. The second resilient element 52 is correspondingly clamped between the inside of the second end closure 14 and the end surface of the damping mass' second end 14. At this embodiment the resilient elements 51, 52 are purely held by friction between on the one hand the resilient element and on the other hand the damping mass 30 and the respective end closure 51, 52. Such friction depends on the compression rate of the resilient members, which compression rate is achieved as described below.

The resilient elements 51, 52 are constituted of a material having a frequency dependent stiffness. In the shown embodiment the resilient elements 51, 52 are formed of 3M® 110, 112, 130 or 242NR01 which are nanostructure polymeric materials.

Figure 1B:
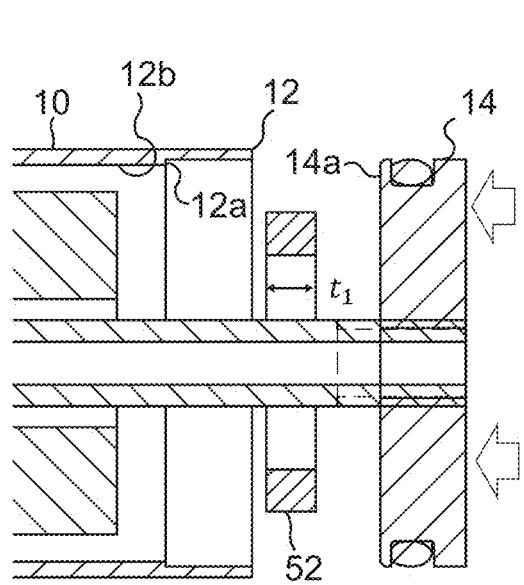
FIG. 1b shows an exploded portion on enlarged scale and FIG. 1c shows a detail thereof in further enlarged scale and when mounted.

The resilient elements 51, 52 are identical and are each formed as an annular ring having a nominal uncompressed thickness $t_1$ in the longitudinal direction of the mass damper device, as best seen in FIG. 1b.

Although the resilient elements 51 and 52 are identical in this embodiment, they do not need to be identical in other embodiments. For example, the elements 51 and 52 can be made of different materials, and the elements 51 and 52 can have different dimension. For example, elements 51 and 52 can have different thickness.

With such resilient elements having a frequency dependent stiffness, it is possible to decide the nominal frequency range by compressing the resilient elements to a corresponding compression rate. In this disclosure the compression rate CR is defined as:

$$CR=(t1-t2)/t1$$

Where t1 is the material thickness before compression and t2 is the material thickness after compression.

The desired compression rate of the resilient elements is achieved by longitudinally compressing the first 41 and second 42 resilient elements equally between the end surfaces 31, 32 of the damping mass 40 and the corresponding end closure 13, 14.

Although the resilient elements 51 and 52 are compressed equally in this embodiment, they can also be compressed into different ratios in other embodiments. For example, when the two elements 51 and 52 have different elastic modulus while the dimensions are identical, the compression ratio of the two elements 51 and 52 are not identical as the element with lower elastic modulus will be compressed more than the other.

The compression of the two resilient elements 51 and 52 is achieved by mounting the end closures 13, 14 at predetermined longitudinal mounting positions such that the distance between the inner surfaces of the end closures 13, 14 and the respective end surface 31, 32 of the damping mass 30 equals the desired thickness t2 after compression of the resilient elements 41, 42.

In the embodiment shown in FIGS. 1*a*-1*b* and as best seen in FIG. 1*b*, this is here achieved by arranging first contact surfaces 11*a*, 12*a* at the first 11 and second 12 ends of the housing 10 and corresponding second contact surfaces 13*a*, 14*a* at the respective end closure 13, 14. In this embodiment the second contact surfaces 13*a*, 14*a* form stop surfaces which are constituted by the inner walls of the end closures 13, 14 and are thus arranged in the same radial plane as the support surface for the resilient element 41, 42 at each respective end closure 12, 14. At this embodiment the distance between the first contact surfaces 11*a*, 12*a* are thus selected as the length of the damping mass 30 plus the desired thickness of both resilient elements 41, 42 after compression. The first contact surfaces 11*a*, 12*a* are further arranged as bottom surfaces of inner cylindrical widened portions or end bores 11*b*, 12*b* at the end portions of the housing 10. The bores 11*b*, 12*b* thus extend axially from the end surface of the housing 10 to the respective first stop surface 11*a*, 12*a*. The inner diameter of the bores 11*b*, 12*b* corresponds to the outer diameter of the end closures 13, 14, such that each end closure 13, 14 may be received in the respective bore 11*b*, 12*b* with a tight fit.

As understood, it is important that the second contact surfaces 13*a*, 14*a* are securely held against the respective first stop surface 11*a*, 12*a* for maintaining the desired compression rate and the nominal frequency range of the mass damper unit comprising the damping mass 30 and the resilient elements 51, 52 during operation. In the embodiment shown in FIGS. 1*a*-*c*, the end closures 13, 14 are axially held in position by the aid of the coolant tube 40. At the first end of the mass damper, the coolant tube 40 exhibits an externally threaded portion 41 which extends axially out beyond the first end closure 13. The second end of the coolant tube 40 also exhibits an externally threaded portion 42 which is threadedly engaged with an internal thread of the second end closure's 14 bore 16.

The first 13 and second 14 end closures are held in position and pressed against the first stop surfaces 11*a*, 12*a* by an internally threaded securing nut 60 which is threaded engaged with the threaded portion 41 and the nut is secured by screwing until the second contact surfaces of the first 13 and second 14 end closure make contact with their corresponding first contact surfaces 11*a*, 12*a*.

In the exemplifying embodiment, there are two end closures in the mass damper device. In another embodiment, the mass damper device can have a number of end closures other than two. For example, one of the end closures and the housing 10 can be formed as a single component, and there will be only one end closure component to assemble in the assembly process. As an example, the housing 10 and one end closure can be extruded, rolling formed or casted as a single component.

For preventing dust and other contaminations from entering into the housing 10, a seal 61 in the form of a rubber o-ring 61 is arranged on the coolant tube 60, between the first end closure 13 and an internal recess in the nut 60.

For the same purpose rubber o-rings 62 are also arranged between the end closures 13 and the housing. These o-rings 62 are received in outer circumferential grooves in the first 13 and second 14 end closure and arranged in sealing contact with inner surfaces of the housing 10.

Although the disclosed embodiments have only the described components, the embodiments can be extended by adding additional components. For example, a plastic disc (example thickness of 1 mm) having an outer diameter close to the outer diameter of the mass 30, and an inner diameter close to the outer diameter of the coolant tube 40, can be disposed between the resilient element 51 or 52 and their respective end closures 13 or 14. By adding such intermediate plastic discs, it is easier to assemble the parts together and the plastic discs can also function as thermal barriers to protect the resilient elements 51 and 52 from heat in the operational environment. The intermediate plastic discs can also be replaced by parts made of other type of materials and having other dimensions and/or geometries.

FIGS. 2*a* and 2*b* illustrate an embodiment where the mounting surfaces are arranged as contact surfaces in an alternative manner. Here the first contact surfaces 111*a*, 112*a* coincide with the end planes of the housing. Corresponding second contact surfaces 113*a*, 114*a*, are arranged on peripheral radially protruding flanges of the end closures 113, 114. Each end closure 113, 114 is inserted into the housing from a respective end until the flanges and the second contact surfaces 113*a*, 114*a* come into contact with and are pressed against the respective first contact surface 111*a*, 112*a* of the housing.

FIG. 3 illustrates another embodiment. At this embodiment the housing 210 and the end closures 213, 214 are provided with mounting surfaces formed as contact surfaces 211*a*, 212*a*, 213*a*, 214*a* as shown in the same manner as the contact surfaces 11*a*, 12*a*, 13*a*, 14*a* shown in FIGS. 1*a*-*c*. This embodiment differs from the previously described mass damper units in that the damping mass 230 exhibits annular recesses 231*a*, 231*b* formed in each end surface 231, 232. An annular resilient element 252, 252 is received in each recess 231*a*, 232*a* and is compressed to the predetermined compression rate against the inner wall of the respective end closure 213, 214 when the end closures 213, 214 have been mounted to the mounting position and the pairs of contact surfaces 211*a*, 212*a*, 213*a*, 214*a* are in contact.

FIG. 4 illustrates a further embodiment where the mounting positions for the end closures 313, 314 are defined by contact surfaces 311*a*, 312*a*, 313*a*, 314*a* arranged at the housing 310 and the end closures 313, 314. Here, the resilient elements 351, 352 formed as annular elements which are supported by annular, chamfered or beveled edge portions 331*a*, 32*a* formed in the end surfaces 331, 332 of the end closures 313, 314. When the end closures 313, 314 have been mounted to the mounting positions, the resilient elements are compressed to the desired compression rate between these edge portions 331*a*, 332*a* on the one hand and, on the other hand, the peripheral portions of the end closures' 313, 314 inner walls and end portions of the housings 310 inner wall.

Figure 5:
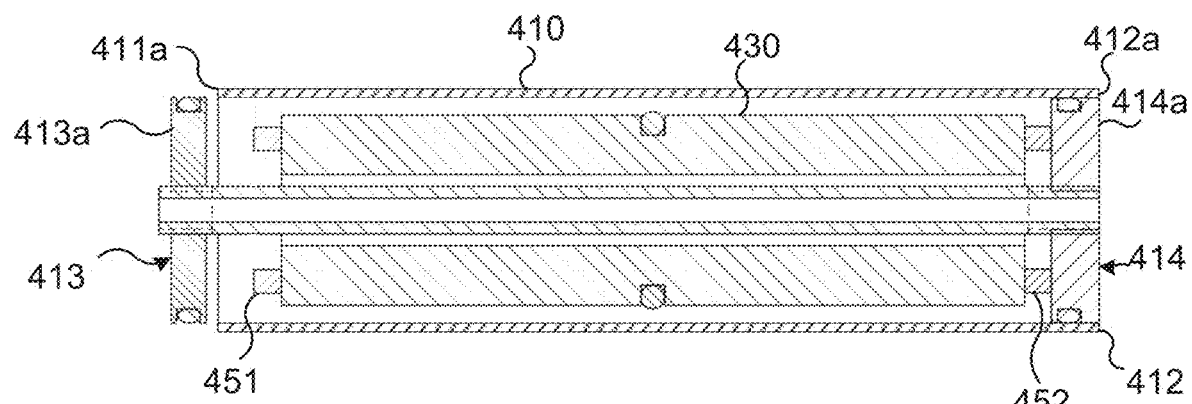
FIG. 5 is a longitudinal section of a mass damper device according to a fifth embodiment.

FIG. 5 illustrates a further alternative embodiment. In this embodiment the mounting surfaces are formed of first 411a, 412a and second 413a, 414a alignment surfaces instead of the contact surfaces as described above. The first alignment surfaces 411a, 412a are formed of the cross sectional end surfaces of the cylindrical housing 410. The second alignment surfaces 413a, 414a are formed of the outer planar end surfaces of the first 413 and second 414 end closure. The length of the housing 410, the length of the damping mass 430, the axial thickness of the resilient elements 451, 452 and the thickness of the end closures 413, 414 are chosen such as to achieve the desired predetermined compression rate of the resilient elements 451, 452 when both end closures has been inserted into the housing 410 at the mounting position where the first alignment surfaces 4111a, 412a are aligned with the respective second alignment surface 413a, 414a. At this embodiment, the resilient elements 451, 452 are fixed to the damping mass 430 by means of adhesion. Such adhesion may be accomplished by an adhesive which is applied between the resilient element on the one hand and the damping mass and the respective end closure on the other hand. Alternatively, the adhesion may be self-adhesion of the materials forming the resilient elements, the damping mass and the end closure. When adhesion is used for fixation of the resilient elements the compression rate may normally be lower than the compression rate required for achieving a secure fixation purely by means of friction. It is also possible to use a combination for friction and adhesion for fixation of the resilient elements.

In practice, when assembling the mass damping device, the damping mass 430 is inserted into the housing 410 and the first 451 and second 452 resilient elements are place at the respective end of the damping mass 430. Thereafter, the enclosures 412, 414 are inserted into the housing 410 from the respective end. The end closures 413, 414 are inserted until the second alignment surfaces 413a, 414a are aligned with the first alignment surfaces 411a, 412a, i.e. when the end closures 413, 414c are flush with the first 411 and second 412 end surface of the housing 410.

The end closures 413, 414 may be press fitted into the housing 410. At such occasions the end closures 413, 414 may be pressed into the housing 410 by means of a tool (not shown) which has a pressing surface larger than the cross-sectional area of the end closures 413, 414. When the end closures have been inserted to the degree that the pressing surface makes contact with the end surface of the housing 410 it is ascertained that the first 411a, 412a and the second 413a, 414a alignment surfaces are aligned and that the resilient elements 451, 452 have been compressed to the desired predetermined compression rate.

At an alternative not shown embodiment the end closures may have external threads and the housings first and second end may be provided with corresponding internal threads. In such cases the end closures may be mounted to the housing by screwing until the outer end surfaces of the end closures are flush with the end surfaces of the housing, i.e. until the first and second alignment surfaces are aligned.

As understood these embodiments at assembly automatically results in a very precise positioning of the end closures relative to the housing and thereby a correct compression rate, with low tolerances, of the resilient elements which in turn assure secure fixation of the resilient elements. The mass damper device also allows easy assembling and further ascertains that the resilient elements may be automatically tuned for achieving the correct nominal Eigen frequency range of the mass damper device.

Figure 6:
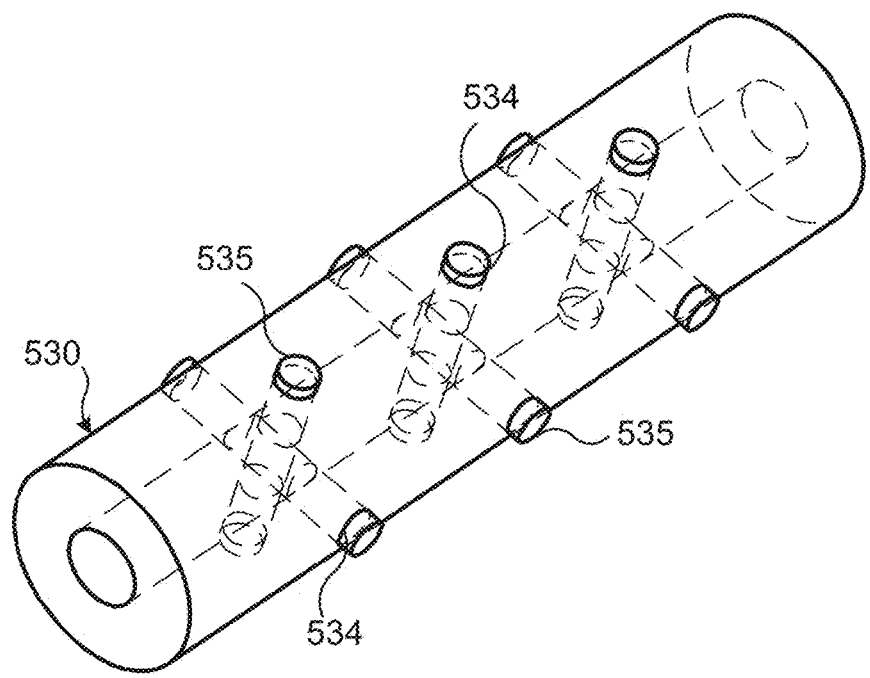
FIG. 6 is a schematic perspective view illustrating a damping mass with distancing members.
Figure 7:
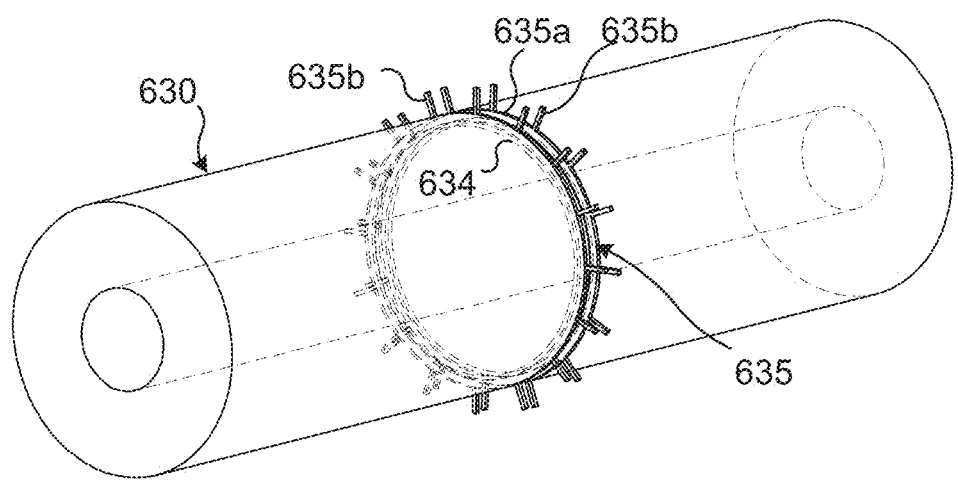
FIG. 7 is a schematic perspective view illustrating alternative distancing members.

FIGS. 1, 6 and 7, illustrate schematically different means for preventing the damping mass from making contact with the circumferential wall of the housing. At some applications there may be a tendency of the material of resilient elements to creep over time. Under the influence of gravity and/or the vibrational forces acting on the damping mass, such creeping may cause the damping mass to be displaced off-center, which reduces the damping efficiency. Creeping may also result in that the damping mass hits the circumferential wall of the housing. Naturally such contact between the damping mass and the housing is most unwanted since it impairs the vibration damping effect of the mass damper and since it may even lead to damage or failure of the mass damping device. The specific means illustrated in FIGS. 6-8 efficiently prevent such creeping and hinder the damping mass from contacting the interior wall of the housing.

At the embodiment shown in FIG. 6, the damping mass 530 is provide with a number of recesses 535 which are distributed in the longitudinal and circumferential envelope surface of the damping mass 530. Each recess 535 receives a radially protruding distancing member 536 in the form of a stud shaped elastic material, such as rubber or the like. The distancing members 436 may be press fitted and/or fixed by adhesives in the respective recesses 435.

It is preferred that the distancing members protrude radially from the damping mass a distance which is smaller than the distance between the damping mass' envelop surface and the inner wall of the housing. By this means the distancing members will not come into contact with the inner wall during normal use without creeping. Such contact would otherwise negatively affect the damping characteristics of the mass damper unit. Typically, the distancing members protrude from the envelope surface of the damping mass a distance which is equal to or less than half of the radial distance between the damping mass and the inner wall of the housing. Thus, in case creeping occurs in the resilient element (not shown in FIG. 6) the distancing member will make contact with the interior wall of the housing, thereby supporting the damping mass 530 and preventing further creeping. For avoiding the just above described problem, the distancing members are preferably made of a material having low stiffness such that in cases where the distancing members 535, during operational vibration, make contact with the interior wall, the Eigen frequency of the damping mass will not be influenced to any significant degree.

At the embodiment shown in FIG. 1, the damping mass is also provided with corresponding means for preventing creeping and hinder the damping mass 30 from making contact with the housing 10. At this embodiment these means comprise a ring 35 of a low stiffness material, such as rubber. The ring 35 is received in a circumferential groove 34 arranged in the envelope surface of the damping mass 30, and arranged such that it protrudes into the gap formed between the damping mass 30 and the cylindrical inner wall of the housing 10.

At a further not shown embodiment the damping mass may be provided with several such grooves and rings distributed one after the other in the longitudinal direction of the damping mass.

FIG. 7 schematically illustrates another means for preventing creeping of the resilient elements and hindering contact between the damping mass and the housing. Here the distancing member 635 comprise an annular base 635a which is received in a circumferential grove 634 formed in the envelope surface of the damping mass 630. A plurality of comparatively thin and elongate pin members 635b extend radially outwards from the base 635a. The pin members 635*b* are formed of a material which, in combination with their elongate shape may sustain axial forces up to a certain threshold. When the axial force exceeds the threshold the pin members 635*b* collapse by bending or buckling. In the shown example the base 635*a* and the pin members 635*b* are made of nylon bristles. However other suitable materials are thermal plastic, metallic wires, fibers and etc. If creeping occurs in the resilient elements (not shown in FIG. 7) the free end of the pin member 635*b* will contact the interior wall of the housing (not shown in FIG. 7). The initial comparatively high stiffness of the pin member will prevent further creeping of the resilient elements. However, during operational vibration of the damping mass 530 the axial force threshold will be exceeded and the pin member will collapse such that its stiffness is reduced considerably. Thereby the pin members 635*b* will not, during operational vibration, influence the Eigen frequency of the damping mass to any significant degree.

Figures 8A, 8B, 8C:
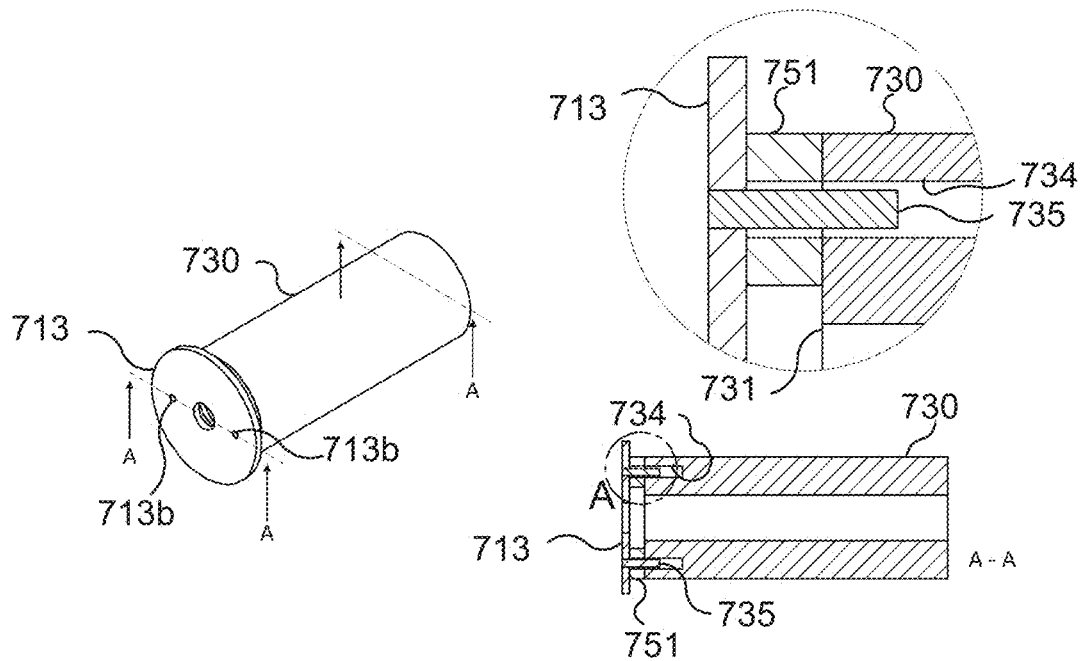
FIG. 8a is a schematic perspective view illustrating further alternative distancing members.
FIG. 8b is a longitudinal section of FIG. 8a and FIG. 8c shows a portion of FIG. 8b in enlarged scale.

FIGS. 8*a-c* illustrates yet another means for preventing creeping of the resilient elements and for hindering the damping mass from contacting the housing. At this embodiment, the end closure 713 exhibits two through holes 713*b* and the corresponding end surface 731 of the damping mass 730 exhibits two corresponding axial bores 734. A distancing member in the form of a flexible pin 735 is inserted through and fixed in each through hole 713*b*. The flexible pins 735 extend through a respective through hole in the resilient element 751 and into the each bore 734.

In case of creeping of the resilient elements 751, the flexible pin 735 will bend but still, by engaging the walls of the bore 734, prevent the damping mass 730 from being displaced radially in the housing. Thereby creeping of the resilient element is limited and the damping mass 730 is, during operational vibration prevented from contacting the interior wall of the housing (not shown in FIGS. 8*a-c*). As an example, the pin 735 is made of Teflon materials, silicon rubbers, fluOro rubber and other materials that have a low creep profile and low elastic modulus.

FIG. 9*a-c* illustrate how the mass damping device shown in FIG. 1 has been implemented in a conventional and standardized tool holder 80. The tool holder 80 comprises cylindrical stem 81 and a head 82 where a cutting tool 83 is removably mounted. A cylindrical interior cavity 84 extends from approximately the mid portion of the stem 81 to the head 82 and is accessible from the end of the stem when the head 82 has been removed. As best seen in FIG. 8*b* the interior cavity 84 has a central extension 85 with reduced diameter which extends from the bottom of the interior cavity in the direction away from the head 82.

Although the embodiment shown in FIG. 9*a*-9*c* has the mass damping device inserted in a tool holder cavity 84, the mass damping device can also be connecting to the tool holder via other means. For example, the mass damping device can connect to a tool holder via glue, threads, welded or brazed onto the tool holder. As an example, the mass damping device can have two ends, whereas one end is connected to the tool body and the other end is connected to the cutter head, instead of inserted into a tool holder cavity. In those cases, the mass damping device is affecting the overall stiffness of the cutter head by functioning as an important element on the stiffness chain.

The mass damping device shown in FIG. 1 is received in the cavity 84 with a circumferential play of approx. 1 mm between the interior wall of the cavity and the outer cylindrical wall of the housing 10 and the securing nut 60 is received in the cavity extension 85. The securing nut 60 is received in the extension 85 with a tight fit, such that the mass damping device is positioned centered with respect to the longitudinal center line of the stem 81. The mass damping device is further suspended in the cavity 84 by means of a first 86 and a second 87 O-rings. The first O-ring 86 is clamped between a chamfered mouth of the extension 85 into the cavity 84 on the one hand and outer surfaces of the first end closure 13 and the securing nut on the other hand. The second O-ring 87 is compressed between the outer wall of the second end closure 14 and an inner wall of the removable head 82. Central fixation of the mass damping device is thus achieved by first inserting the mass damping device in the cavity 84 and thereafter mounting the head 82 to the stem 81 of the tool holder.

As understood, the use of a pre-assembled mass damping module, which has already been tuned to the correct nominal frequency range and which may easily be mounted to a standardized tool holder greatly facilitates the process of preventing vibrations at any machine tool.

At the example shown in FIGS. 9*a-c*, the radial play between the housing 10 and the interior wall of the tool holder's cavity 84 as well as the O-rings 86, 87 forms a thermal insulations which reduces the heat transmission from the tool 83 to the mass damping device, thereby reducing the risk of the resilient elements 51, 52 to be heated such that their stiffness and thereby the frequency range of the mass damping device is influenced. At the shown example, the gap between the housing 10 and the interior wall of the cavity 84 is filled with air. However, in other not shown embodiments this gap may be filled with other heat insulating materials, such as rubber or other polymer materials. In a further not shown example the housing may be received in the cavity by a tight fit or by press fitting. In such cases the housing may or may not be coated by a thermally insulating coating.

FIG. 10 is a diagram illustrating the relationship between compression rate or ratio of resilient elements (nominal dimension before compression $t_1$ and after compression t2), nominal stiffness of resilient elements and a mass dampers' damping efficiency. In the diagram, the damping efficiency of the mass damping device according to the invention (using dimension-controlled compression of resilient elements), is compared with previously known mass damping devices (using torque controlled compression of resilient elements).

The diagram shows the nominal stiffness of the resilient elements in mass damping devices and the efficiency of the mass damper device as a function of the compression rate of the resilient element. In an example where the optimal compression rate of the resilient elements (thickness 0.7 mm) is 30%, the optimized thickness t2 of the resilient elements after compression is 0.49 mm. Using torque-controlled compression rate, the torque wrench has an error range of +20%, and the resilient elements after compression may have a thickness between 0.35 mm and 0.63 mm (compression ratio between 50% and 90%). Using dimension-controlled compression rate according to the invention instead, the fine finished components will allow a dimension error range of +100 μm in assembly (over a linear length of 70 mm), and the dimension error is divided by two when there are two resilient elements compressed. Thus, the dimension error range for each of the two resilient elements is +50 μm, and the compression ratio of the resilient elements is between 63% and 77% (t2 range between 0.45 mm and 0.54 mm), which is narrower and the mass damper's damping efficiency is kept close to the optimum situation.

With the damping mass device according to the present disclosure it has proven that the device may be applied not only to working tool holders but also directly to the working tool. At some applications this constitutes an important advantage since the mass damper device is then positioned closer to the area where the vibrations to be damped are generated.

In FIGS. 11a-12b it is illustrated how a damping mass device according to the present disclosure may be applied to such a working tool.

Figure 11A:
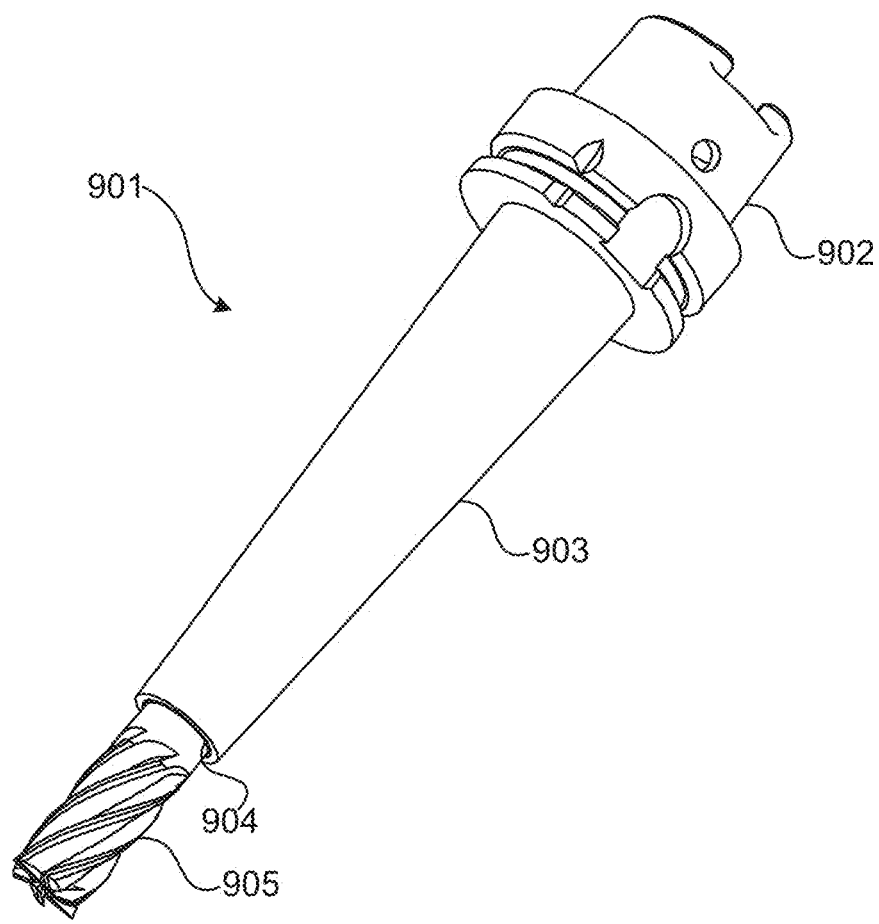
Figure 11B:
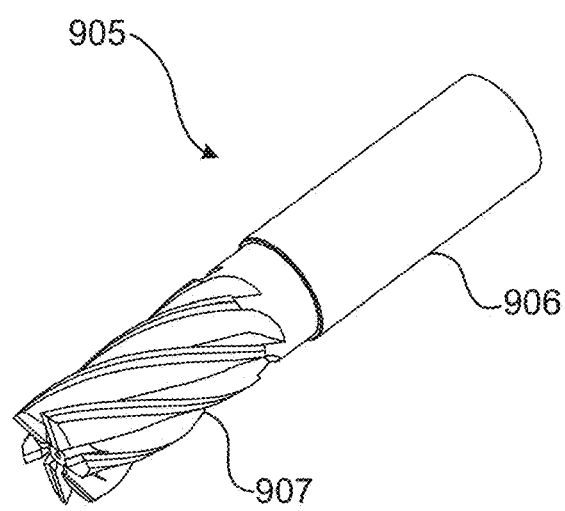
Figure 13:
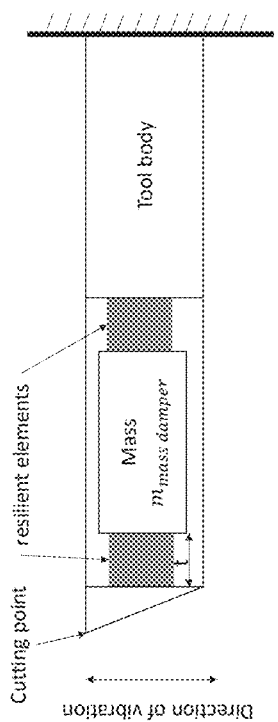
FIG. 13 is a schematic diagram illustrating the general principle of a damping mas according to the prior art.

FIG. 11a shows a working tool holder 901 having a first end provided with an end piece 902 which is arranged to be fixed to a rotatable support such as a spindle (not shown), An elongate and tapering main body 903 extends axially from the end piece 902. The main body 903 exhibits, at its free end which is opposite to the end piece 902, a working tool fixation opening 904 for fixedly receiving a working tool 905. In the shown example the working tool constitutes a milling tool. As best seen in FIG. 11b the working tool comprises a mounting portion or shank 906 which, in use, is fixedly received in the fixation opening 904. The working tool further comprises a tool portion 907 which exhibits a number of spiral teeth and intermediate flutes.

In the shown example the working tool 905 is formed of a carbide material such as tungsten carbide and titanium carbide. Other suitable materials are high speed steel and ceramics.

Figure 1C:
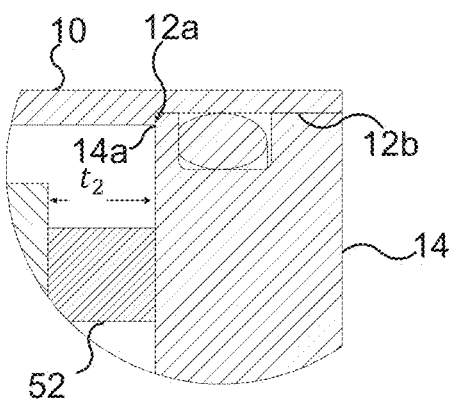

In FIG. 12a it is illustrated how a mass damper device is applied directly to the working tool 905, As best seen in FIG. 12b the damping mass device according to this embodiment is similar to the damping mas device shown in FIGS. 1a-c. It comprises a cylindrical tubular housing 910 with a first 911 and a second 912 longitudinal end. A first contact surface 911a, 912a is arranged in proximity to each longitudinal end. A first end closure 913 is inserted into the first end such that a second contact surface 913a of the first end closure comes into contact with the first contact surface 911a at the first longitudinal end 911. Correspondingly, a second end closure 914 is inserted into the second end 912 such that a second contact surface 914a of the first end closure 914 comes into contact with the first contact surface 912a at the first longitudinal end 912.

The mass damper device further comprises a damping mass 930 which is received in the housing 910 and arranged between the end closures 912, 913. The damping mass 930 is formed generally as annular cylindrical body having a constant cross section with an outer diameter and an inner bore 933. The damping mass 30 exhibits a first longitudinal end 931 and a second longitudinal end 932. In the shown example, the damping mass 930 exhibits an outer circumferential outer grove 934 which is arranged centrally between the first 931 and second 932 longitudinal ends and which receives a distancing member 935.

A coolant media tube 940 extends with a radial clearance through the central bore 933 and is received in central through openings 915, 916 in the first 913 and second 914 end closures respectively.

The mass damper further comprises a first 951 and a second 952 resilient element. The resilient elements 951, 952 are arranged for holding the damping mass 30 in the housing 10. So far, the embodiment shown in FIG. 12b fully corresponds to the mass damper device shown in FIGS. 1a-c.

The mass damper device shown in FIG. 12b however differ from the previous embodiments in that it comprises a first heat insulating disk 961 which is arranged between the first end closure 913 and the first resilient element 951. Correspondingly a second heat insulating disk 962 is arranged between the second end closure 915 and the second resilient element 952. In the shown embodiment, the heat insulating plates are circular having a diameter which is essentially equal to the outer diameter of the damping mass 930. However, the geometry and dimension of the heat insulating disk may be different such that they may have e.g. a polygonal cross section. In the shown example, the heat insulating disks 961, 962 are made of PC polycarbonate. Alternatively, the heat insulating disks can be made of steel or aluminum, with or without surface coatings.

Hence, at this embodiment the first resilient element 951 is clamped between the inside of the first heat insulating disk 961 and the end surface of the damping mass' first end 931. The second resilient element 952 is correspondingly clamped between the inside of the second heat insulating disk 962 and the end surface of the damping mass' second end 914.

As in the mass damper device shown in FIGS. 1a-c, the first contact surfaces 911a, 912a and the second contact surfaces 913a, 914a are arranged such that the first 951 and second 952 resilient elements are compressed to the predetermined compression rate, via the heat insulating plates 961, 962 when the end closures 613, 914 have been inserted to the respective longitudinal mounting position, where the second contact surfaces 913a, 914a make contact with the first contact surfaces 911a, 912a.

Just as in the previous embodiments, the resilient elements 951, 952 are constituted of a material having a frequency dependent stiffness.

The damping mass device shown in FIG. 12b thus forms an integral modular unit which may readily be inserted into and extracted from a working tool or a working toll holder.

FIG. 12a illustrates how the damping mass device shown in FIG. 12b has been inserted into and fixed in the working tool 905. The working tool 905 exhibits a cavity or bore 908 which extends from the free end of the shank 906 centrally in the axial direction towards the tool portion 907 of the working tool 905a. The bore 908 exhibits a cylindrical portion 908a arranged proximal to the free end of the shank 906 and is open at the free end of the shank 906. At the end of the bore 908 arranged proximal to the tool portion 907 the inner diameter tapers towards the tool portion 907 such that the bore exhibits a bottom portion 908b where the transition between the bottom surface arranged in a radial plane and the cylindrical wall of the bore 908 is rounded. This rounded bottom portion 908b reduces stress concentrations in the working tool when in use. The inner diameter of the cylindrical portion 908a is essentially equal to the outer diameter of the mass damper devices housing 910. Additionally, the axial length of the cylindrical portion 908a is essentially equal to or somewhat longer than the axial length of housing 910.

The mass damper device may thus readily be inserted into the cylindrical portion 908a of the bore 908 and securely fixed therein by press fitting. When an already inserted mass damper device is to be exchanged in the working tool 905, it suffices to detach the working tool 905 from the working tool holder 901, extract the old mass damper device from the bore 908, insert a new mass damper device into the bore 908 ant reattach the working tool 905 to the working tool holder 901.

The mass damper device may alternatively be fixed in the bore 908 by other means than press fitting. Examples of such other means are by adhesives, threads, shrink fit (cooling down or heating up) and external means of fixing, such as by a plug inserted into the bore externally of the mass damper device.

Above exemplifying embodiments of the invention have been described. The invention is however not limited to these examples but may be varied within scope of the appended claims. For example, the different means for preventing creeping of the resilient elements and contact between the damping mass and the housing may freely be combined with the different arrangements of the mounting surfaces described above.

What is claimed is:

1. A mass damper device comprising:
   a tubular housing having a first and a second longitudinal end;
   a damping mass which is received in the tubular housing with a circumferential clearance and which exhibits a central bore;
   a first resilient element and a second resilient element, each of the first and second resilient elements comprising a material having a frequency depending Young's modulus,
   a first end closure arranged at the first longitudinal end and exhibiting a central through opening,
   a second end closure arranged at the second longitudinal end and exhibiting a central through opening,
   a coolant media tube which extends with a radial clearance through the central bore and is received in the central through opening of each end closure, wherein:
   the housing and the end closures have cooperating mounting surfaces which define a longitudinal mounting position of the end closures;
   the mounting surfaces are arranged such that the first and second resilient elements are compressed to a predetermined compression rate between the damping mass and the end closures, by mounting the end closures, at the longitudinal mounting position, to the housing; and
   the housing, the damping mass, the first and the second resilient elements, and the first and the second end closures form an integral module which is arranged to be inserted into and extracted from a working tool or a working tool holder.

2. The mass damper device according to claim 1, wherein the predetermined compression rate ranges between 5% and 50%.

3. The mass damper device according to claim 1, wherein the mounting surfaces are mutually parallel and arranged such that each resilient element is evenly compressed over its surfaces facing the damping mass and the end closure.

4. The mass damper device according to claim 1, wherein the cooperating mounting surfaces comprise at least one first contact surface arranged at or in proximity to a longitudinal end of the housing and at least one second contact surface arranged at the first and/or a second end closure, which first and second contact surfaces are in mutual contact when the respective end closure is in the longitudinal mounting position.

5. The mass damper device according to claim 1, wherein the cooperating mounting surfaces comprise a least one first alignment surface arranged at or in proximity to a longitudinal end of the housing and at least one second alignment surface arranged at the first and/or a second end closure, which first and second alignment surfaces are arranged in the same cross sectional plane of the housing when the respective end closure is in the longitudinal mounting position.

6. The mass damper device according to claim 1, wherein the first and/or second resilient elements comprise a material at which, after mounting the end closure at the longitudinal mounting position, the Young's modulus increases by at least 20% when the vibration frequency of the damping mass increase by 100%, over the frequency range from 100 Hz to 2000 Hz.

7. The mass damper device according to claim 1, wherein said material comprises a nanostructure material with a structural size of 100 nm or less in at least one dimension.

8. The mass damper device according to claim 1, further comprising at least one sealing arranged between the housing and the first and/or second end closure.

9. The mass damper device according to claim 1, wherein the predetermined compression rate ranges between 20% and 30%.

10. A working tool comprising the mass damper device according to claim 1.

11. A working tool holder comprising the mass damper device according to claim 1.

12. The mass damper device according to claim 1, wherein the damping mass is provided with at least one distancing member arranged to prevent the damping mass from contacting the interior longitudinal wall of the housing.

13. The mass damper device according to claim 12, wherein the at least one distancing member comprises an annular member which encircles the damping mass.

14. The mass damper device according to claim 12, wherein the distancing member comprises a plurality of elongate members which extend radially out from the envelope surface of the damping mass and which are arranged to bend or buckle when making contact with the inner wall of the housing.

15. The mass damper device according to claim 12, wherein the distancing member comprises a plurality of stud shaped members which extend radially out from the envelope surface of the damping mass and which are arranged to be axially compressed when making contact with the inner wall of the housing.

16. The mass damper device according to claim 12, wherein the at least one distancing member comprises a pin shaped member which extends longitudinally from the damping mass to one of the first and second end closures.

* * * * *